(12) United States Patent
Winkelmann

(10) Patent No.: US 9,382,345 B2
(45) Date of Patent: *Jul. 5, 2016

(54) POLYMER COMPOUNDS HAVING COUPLED COMPONENTS

(76) Inventor: Felix Winkelmann, Bonn (DE)

( * ) Notice: Subject to any disclaimer, the term of this patent is extended or adjusted under 35 U.S.C. 154(b) by 146 days.

This patent is subject to a terminal disclaimer.

(21) Appl. No.: 14/003,996

(22) PCT Filed: Mar. 9, 2012

(86) PCT No.: PCT/EP2012/001064
§ 371 (c)(1),
(2), (4) Date: Nov. 18, 2013

(87) PCT Pub. No.: WO2012/119783
PCT Pub. Date: Sep. 13, 2012

(65) Prior Publication Data
US 2014/0080938 A1    Mar. 20, 2014

(30) Foreign Application Priority Data

Mar. 9, 2011  (DE) .......................... 10 2011 013 465
Mar. 9, 2011  (DE) .......................... 10 2011 013 508

(51) Int. Cl.
| | | |
|---|---|---|
| *C08F 8/00* | (2006.01) | |
| *C08F 110/00* | (2006.01) | |
| *C08K 9/08* | (2006.01) | |
| *C09C 3/10* | (2006.01) | |
| *C08F 110/02* | (2006.01) | |
| *C08F 110/06* | (2006.01) | |
| *C08F 112/08* | (2006.01) | |
| *C08F 114/06* | (2006.01) | |
| *C08F 114/18* | (2006.01) | |
| *C08F 114/20* | (2006.01) | |
| *C08F 114/22* | (2006.01) | |
| *C08F 116/06* | (2006.01) | |
| *C08F 210/06* | (2006.01) | |
| *C08F 214/26* | (2006.01) | |
| *C08F 220/12* | (2006.01) | |
| *C08F 220/40* | (2006.01) | |
| *C08G 18/82* | (2006.01) | |
| *C08G 18/83* | (2006.01) | |
| *C08G 63/88* | (2006.01) | |
| *C08G 63/91* | (2006.01) | |
| *C08G 65/30* | (2006.01) | |
| *C08G 65/32* | (2006.01) | |
| *C08G 69/46* | (2006.01) | |
| *C08G 69/48* | (2006.01) | |

(52) U.S. Cl.
CPC ............... *C08F 8/00* (2013.01); *C08F 110/00* (2013.01); *C08F 110/02* (2013.01); *C08F 110/06* (2013.01); *C08F 112/08* (2013.01); *C08F 114/06* (2013.01); *C08F 114/185* (2013.01); *C08F 114/20* (2013.01); *C08F 114/22* (2013.01); *C08F 116/06* (2013.01); *C08F 210/06* (2013.01); *C08F 214/26* (2013.01); *C08F 220/12* (2013.01); *C08F 220/40* (2013.01); *C08G 18/82* (2013.01); *C08G 18/83* (2013.01); *C08G 63/88* (2013.01); *C08G 63/91* (2013.01); *C08G 65/30* (2013.01); *C08G 65/32* (2013.01); *C08G 69/46* (2013.01); *C08G 69/48* (2013.01); *C08K 9/08* (2013.01); *C09C 3/10* (2013.01)

(58) Field of Classification Search
CPC ........................................................ C09C 3/12
See application file for complete search history.

(56) References Cited

U.S. PATENT DOCUMENTS

| | | | | |
|---|---|---|---|---|
| 5,256,706 A | * | 10/1993 | Carpenter et al. | 523/213 |
| 5,910,523 A | * | 6/1999 | Hudson | 523/213 |
| 8,343,270 B2 | * | 1/2013 | Jennrich et al. | 106/287.35 |
| 2003/0149154 A1 | * | 8/2003 | Heinemann et al. | 524/442 |
| 2004/0180193 A1 | * | 9/2004 | Oda et al. | 428/328 |
| 2007/0010600 A1 | * | 1/2007 | Goodman et al. | 523/216 |
| 2009/0298991 A1 | * | 12/2009 | Kwon et al. | 524/443 |
| 2012/0135216 A1 | * | 5/2012 | Kwon et al. | 428/220 |

FOREIGN PATENT DOCUMENTS

| | | |
|---|---|---|
| EP | 1 340 788 A2 | 9/2003 |
| EP | 1 630 206 A2 | 3/2006 |
| WO | 93 11190 A1 | 6/1993 |
| WO | 01 96459 A1 | 12/2001 |

* cited by examiner

*Primary Examiner* — Sanza McClendon
(74) *Attorney, Agent, or Firm* — Hudak, Shunk & Farine Co. LPA

(57) ABSTRACT

Intermediate products (compounds, semi-finished goods) for polymer materials having coupled components, to the polymer materials based on the intermediate products, and to the components to be manufactured therefrom. A method for producing intermediate products, polymer materials and components, and to the use thereof.

14 Claims, No Drawings

POLYMER COMPOUNDS HAVING COUPLED COMPONENTS

FIELD OF THE INVENTION

The invention relates to intermediate products (semi-finished products/compounds) for polymeric materials with surface-modified filler components, the polymeric materials on the basis of the intermediate products and their end-products, a process for their preparation of the intermediate products, the end-products and their use.

BACKGROUND OF THE INVENTION

Intermediate products, in this context, are materials, compounds and semi-finished products. End-products are component parts, parts, which must not be further formed for their end-use. They can be assembled to a functional device.

In the plastics industry it is a common procedure to improve the characteristic profiles of the known polymers by blending (compounding) of additives such as fillers and additives.

Polymer compounds consist of at least two phases, one of these phases is an inorganic material. The inorganic phase is surrounded from an organic phase. This organic phase is called binder, resin or more general polymer matrix.

Compounds in terms of this invention are two-component-systems, respectively multi-component systems with one organic phase, which is called the matrix, an different other phases (called addition-phase), which are immiscible during compounding or during use. The phase boundaries could be compatibilized with a coupling agent or they can be modified with an inter-phase.

From EP 1 340 788 A2 for example, is the preparation of a compound known based on a thermoplastic material. As will be described in this document, are thermoplastics, for example polyvinyl chloride, with a crosslinking agent, a stabilizer, chalk as an filler and an alkylbenzophenone processed as a radical former to a workable compound. After molding, in this extrusion, the polymer is crosslinked by irradiation with UV light. The fillers are merely physically incorporated into the thermoplastic and have only a filling function. After this standard crosslinking procedure the thermoplastic material has lost his thermoplastic properties.

SUMMARY OF THE INVENTION

Object of the present invention is the use of addition-components (like a filler) as one component in polymer compounds to increase the mechanical stability, for example the tensile strength, impact strength, crack resistance, tensile strength, scratch resistance and elastic modulus, scratch resistance or chemical resistance.

DETAILED DESCRIPTION OF THE INVENTION

Novel intermediate products for polymeric materials and end-products with addition-components, which can be surface-modified, a free radical former, a matrix polymer and optionally other additives were found, characterized in that the polymer chains of the matrix polymer are chemically bounded at the surface of the addition-component.

The chemical binding can be realized in addition with parts of the radical former or via the cross-linker.

In comparison to per se known polymer compounds are in the new compounds based on the novel intermediate products, the addition-components with the polymer chemically crosslinked and not as a filler only physically incorporated. Unlike other cross-linked thermoplastics, cross-linking is in priority to the mineral surface, while the rest of the thermoplastic component is substantially uncrosslinked further present and thus a thermoplastic processing is accessible.

According to the present invention, the new compounds exhibit enhanced chemical and mechanical stability, such as the strength or the tensile strength and impact strength or the elastic modulus as compared to compounds with incorporated mineral components or only coupling agents on surface-modified mineral fillers. Even for non-mineral addition-components (e.g. textile fibers, etc.) are new material properties are available.

With the novel intermediate products according to the invention, a new class of polymeric composite materials is ventured (polymer compounds).

The addition-components can be subdivided in two groups:

a) Mineral components for polymer compounds in the context of the present invention can be, for example: mineralic components, materials containing silicates or silicate structures showing materials or metal oxides or oxidic structure showing material or metal hydroxides or materials with metal hydroxides, carbides, carbon-based materials like carbon black, carbon fibers, carbon nanotubes (with different structures like) fullerene, nitrides or nitrogen containing components, carbonates, sulfates or oxides or oxi-hydrates, fibers (e.g. glass or basalt) or mixtures out of them.

b) Organic components are particularly, which are immiscible with the matrix polymer during processing or use: duroplastics/thermosets, thermoplastics, elastomers or thermoplastic elastomers (all as polymers, pre-polymers or oligomers), with an particulate habitus (e.g. as particle, fiber or plate) or fibers (textile fibers, technical fibers) or built from natural raw materials like natural fibers as hemp fibers or sisal fibers etc.

Mineral components for polymeric materials in the context of the present invention can be for example silicates: natural and synthetic silicates, pyrogene and precipitated silicas, so-called islandsilicates, chain silicates, band-silicates, network and layer silicates or alumosilicates, minerals of the quartz group (quartz, fused silica, cristobalite), zeolites, feldspars, calcium silicate minerals or calcium-silicate-hydrate phases minerals (e.g. tobermorite or xonotlite) or metal oxides: natural or synthetic metal oxides such as alumina, silica, magnesium oxide, calcium oxide, titanium dioxide, iron oxide, zinc oxide, metal hydroxides: magnesium hydroxide, aluminum hydroxide and others. This is, of course, only a listing of possible components.

Preferably in the context of the present invention, the addition-component consists of organic components, which is immiscible with the matrix polymer or inorganic material containing surface hydroxyl groups like e.g. silicates and/or alumosilicates and/or silicon dioxide and/or aluminum oxide and/or titanium dioxide. Also carbon-fibers or glass-fibers or stone wool-fibers or basalt fibers may be used as well as carbon nanotubes (CNT).

For example, the following mineral addition-components are: mica, talcum, wollastonite, asbestos, quartz, fused silica, silica glass, micro silica, kaolin, calcined kaolin, xonotlite, tobermorite, nepheline syenite, aluminum oxide, titanium dioxide, chalk, sand, diatomaceous earth, graphite, carbon black, carbon fibers, carbon-nanotubes (CNT), mica (muscovite, phlogopite, sericite) aluminosilicates, clays (e.g. montmorillonite) carbon fibers, glass flakes, aluminum hydroxide (ATH), magnesium hydroxide (MDH), metal oxides such as aluminum oxide, titanium dioxide, calcium carbonate (GCC, PCC, marble), gypsum, wollastonite, basalt fibers and powder, rock wool fibers, quartz powder, fused silica, micro silica or feldspar. This is only an exemplary list of possible components.

In the context of the present invention, the addition-component can appear in granular form. In a preferred embodiment of the present invention is the mineral addition-component present in finely dispersed form.

It is preferable that the addition-component is present in a grain size of less than 4 mm.

In particular, it is preferred that the addition-component present in a grain size of 2 nm to 350 microns.

In a different preferred form, the addition-component is in a fibrous form (e.g. like glass fibers, mineral fibers, natural fibers, textile fibers, etc.) with synthetic or natural origin.

The intermediate products according to the invention are covered on the surface of the addition-component in a largely mono-molecular layer, or at least covered in sub-monolayer. Multi-layers are also possible.

The radical former is deposited on the internal surface build of addition-component and matrix polymer. That means a core-shell structure is build up.

In the case that is desired in the context of the invention, that the addition-component is not linked completely with the polymer, of course, a partial cover is also possible (sub-monolayer).

Radical former in the context of the present invention are known per se. These are materials, which decay into radical under energetic impact.

Radical former in the context of the present invention can be: photo initiators, photosensitizers or crosslinking agent. It can also be functional silanes or siloxanes with functional groups which break down under energetic impact in free radicals and/or initiate a crosslinking reaction.

Preferred free radical in the context of the present invention can be: photoinitiators: benzoin ethers, benzil, benzyl-ketals, alpha-splitter such as alpha, alpha-diethoxyacetophenone, alpha-hydroxyalkylphenones, alpha-aminoalkylphenones, aromatic ketone systems of coinitiators: benzophenones and substituted benzophenones, Mischlerskeone, photosensitizers: aromatic haloketones: phenacylchloride, desylchloride or 4-Chlormethylbenzophenone crosslinking agents: trimethylole-propane-trimethacrylate (TRIM) or triallyl-cyanurate (TAC), triallylisocyanurte (TAIC).

In the context of the present invention, polymers are attached to the surface of the addition-component and then cross-linked with it.

Polymers in the context of the present invention are (un-)saturated, unbranched or branched, grafted or ungrafted thermoplastics and thermoplastic elastomers. They can be provided by addition reactions or by grafting with reactive groups.

For example, the polymers are: Polyethylene (PE) Polypropylene (PP), mixtures of PE and PE (e.g. grafted and ungrafted types), Polyamide (PA), Polyurethane (PUR), Polyvinylchloride (PVC), Polycarbonate (PC), PMMA, Polyaryle-ether-ketones (for example PEEK), Polyoxymethylene (POM), Polystyrenes (PS), Polyimides, thermoplastic elastomers and natural polymers. This is only a selection of generally usable polymers.

In the context of the present invention it is possible that the inventive intermediate products contain additional known admixtures or additives.

Admixtures (additives) are for example: flame retardants such as aluminum-trihydroxide (ATH) or magnesium hydroxide (MDH), stabilizers such as metal soaps and organo-tin compounds, plasticizers such as substituted phthalates (e.g. dibutyl-phthalate), lubricants such as paraffin or UV stabilizing agents or fillers such as marble powder or silicates.

Coupling agents in the context of the present invention act as a linking or grafting spot (point) between surface of the addition-component and the polymer.

Coupling agents are known per se. Examples are silanes, such as H-silanes and siloxanes, such as bifunctional silanes, respectively partially condensed silanes or functional siloxanes, functional polysilxanes, silicone oils, organo-metalalkoxides, maleic-anhydride, grafted polymer metal-soaps, low molecular olefins, fats, wax or oils also other organo-metal alkoxides can be used.

For example, the following coupling agents can be: organo-silanes (eg. AMEO®) respectively Organo-siloxanes, titanates, organo zirconates, maleic anhydride grafted polyethylene or other MSA, Ca-stearate, fatty acids.

In particular, preferred as coupling agent are: amino-silanes or functional silanes with amino groups, vinyl-silanes, acrylic-silanes, methacryloyl-silanes, octyl-silanes or epoxy-silanes.

Compatibilizers are grafted copolymers or block copolymers.

It also has been found a process for producing the intermediate products for polymeric materials with components, which is characterized in that the radical former is concentrated on the surface of the addition-component, the polymer is added and the crosslinking is initiated by energetic impact.

The radical former can be in solid and/or finest dispersed and/or liquid state and/or in solution with the filler material component mixed and distributed on the surface of the addition-component.

It is generally preferred to distribute the radical former uniformly on the addition-component.

For the present method according to the invention is preferable to dissolve the radical former in a solvent and to distribute on the addition-component.

Suitable solvents for the solution of the radical formers are for example: alcohols, halogenated organic solvents, silanes, alkanes and alkens and ionic liquids.

Preferred solvents are for example: methanole, methylene chloride, ethanol, isopropanol, acetone, organosilanes such as amino silanes or octylsilanes or other bi- or multi-functional silanes and ionic liquids.

Of course it is also possible to use mixtures of the solvents.

A preferred embodiment of the inventive method is characterized in that the addition-component and the radical former in a mass ratio less than 5%, preferably in a ratio of less than 2% by weight is used, in relation to the mass of the addition-component.

In a preferred embodiment of the method according to the invention is the addition-component present in finely dispersed form.

It is preferable that the mineral component in a particle size of less than 4 mm is present.

In particular, it is preferred that the addition-component is present in a grain size of 5 nm to 350 microns.

In an alternatively preferred embodiment of the method according to the invention is the addition-component present in fibrous form.

The thermoplast and the Interphase can be added as a soluted matrix polymer, as oligomer, or as prepolymer, a monomer, gaseous, soluted, or as low molecular powder added to the addition-component with the radical starter. It is, of course, possible to use mixtures of polymers.

Surprisingly, with compounding it is possible to build up a structure, that allows to widely restrict the cross linking reaction between the polymer on the surface of the addition-component and to prevent the cross linking inside the bulk of polymer matrix. That conserves the origin thermoplastics behavior and the generated compound is standard processing in plastics industry, e.g. molding, accessible. With known standard cross linked polymers this was not possible respectively not known so far. Thus extensive dissolvent based processes for the surface coating of the addition-component with the thermoplastic matrix polymer can be avoided. Thereto the matrix polymer and the radical starter coated addition-component are processed with standard compounders used in plastics industry. The in that way generated compound can be cross linked direct and after that shaped or first processed in the sense of shaping (e.g. injection molding, blow molding, extrusion, etc.) and afterward getting cross linked.

The relative amounts of the radical former and of the thermoplastic material can vary in wide limits and are determined by the desired degree of cross linking.

In a preferred embodiment of the present invention as a first layer the surface of the addition-component is coated with a coupling agent. This step can be applied but is not be obliged necessarily. As a following step, the radical former is deposited after that.

Coupling agents, in the context of the present invention, enhance the adhesion of the matrix polymer on the addition-component by acting as a surfactant, that means improving wettability and spreading on the surface.

Coupling agents are known per se. Examples are silanes, such as H-silanes and siloxanes, such as bifunctional silanes respectively partially condensed silanes or functional siloxanes, it could also be used other organo-metal alkoxides.

For example, the following coupling agents are: organo-silanes, respectively siloxanes (e.g. Ameo®), organotitanates, organo-zirconates, maleic-anhydride grafted polyethylene, respectively other MSA, calcium-stearate, fatty acids.

In particular, preferred coupling agents are: aminosilanes, vinyl-silanes, acrylic-silanes, methacrylic-silanes, octyl-silanes, epoxy-silanes or amino-groups containing silanes.

For the inventive process, it is preferred to dissolve the coupling agent in a solvent and distribute it among the filler component and to react it with the surface.

Solvents to dissolve the coupling agent are, for example: methanol, ethanol, propanol, isopropanol, or toluene.

Of course, it is also possible to use mixtures of the solvent or to apply the adhesive agent directly.

The concentration of the coupling agent in the solvent is generally in the range from 1 to 90 wt %, preferred is the range of 20 to 70 wt %.

After action and if applicable reaction of the coupling agent with the surface, the radical former is applied, the solvent is removed, and after that fed to the compounder. Has the addition-component enough linkage sizes, like organic fibers or surfaces, it is often possible to neglect the step of treatment with a coupling agent.

The reaction, and thus the crosslinking of the coated addition-component with the matrix polymer in the context of the present invention, is started by energetic impact in a known manner.

In a preferred embodiment of the present invention, the reaction is initiated by exposure to energy in the form of ionizing radiation.

The energetic impact can be introduced by ionizing radiation or electromagnetic radiation. In the context of the present invention is beta radiation (electron beam) in the range 1 keV to 150 MeV, preferably in the range 1 keV to 100 MeV, particularly preferably in the range of 3 keV to 80 MeV applied.

Within the scope of the present invention, the dose is from 0.1 to 500 kGy, preferably 1 to 150 kGy, in particular preferably from 2 to 100 kGy.

The irradiation time with the respectively applied energy is adjusted to achieve the desired dose rate in each case.

The irradiation is performed so that the melt in the extruder is irradiated directly, or the outgoing strands are irradiated directly, or that after granulation of the polymer strand the granulate particles are irradiated directly, so that the interphases (addition-component and polymer) are getting grafted. In the latter case the free flowing bulk solid (granulate) is turned around in a reactor.

The method according to the present invention for manufacturing the intermediate products can for example be performed as follows:

1. The free-flowing powder of mineral nature (silica based flour, e.g. silica powder) is circulated in the reactor.
2. The silane-solvent mixture for example will be sprayed and the particle surface will be coated with the mixture (e.g. spray coating).
3. The reaction of the silane-coupling to the mineral surface is performed with thermal assistance.
4. Arising and residual solvent will be removed.
5. Repeat steps 2 to 4 until the desired nominal cover relative to the specific surface, determined by the BET method, is reached. Typically it is operated on a monomolecular coverage. Other degrees of coverage are possible. As an orientation about 0.5 wt % of an amino silane on a mineral flour with about 8 $m^2/g$ specific surface area were applied.
6. The radical formers are applied directly or in solution to the particle surfaces (typically spray-coating). For orientation, approximately 0.5 wt % of the radical former is applied to cover widely the surface of the organic surface-modified mineral component. Sometimes it is helpful to use more intensive mixer units like a kneder or a Lödige-mixer or a Henschel mixer or a mill.
8. The solvent is removed during the stirring by the mixing unit.
9. A vacuum is applied.
10. After drying the powder is fed to the compounding process.
11. The irradiation is preferably carried, so that all particle surfaces are uniformly cross linked. The degree of crosslinking depends on the requirements of the final product and is adjusted by the irradiation energy and the irradiation time. The irradiation can be carried out spatially elsewhere and is independent from the preparation of the coating. For this, commercial systems are available. The radiation dose is about 100 kGy, depending on the desired crosslinking strength. The thickness of the irradiated good should be proportional to the penetration depth, in this case to radiation it should not be about 4 mm.
12. The final intermediate product can be used to continue processing to a compound, which then can be used to continue thermoplastic processing as plastic molding of components.

In a preferred embodiment according to the invention, the irradiation of the material can be applied after the shaping process (e.g. injection molding). The components produced by this process show all characteristic features of the internal cross linking at the surface of the addition-component (e.g. fillers surface). The irradiation dose should be applied like mentioned above.

Based on the novel intermediate products according to the invention a new class of polymeric materials is established in which the addition-component is chemically cross-linked with the polymer.

The present invention therefore also provides new polymeric materials and parts based on thermoplastics and optionally other polymers, addition-components like e.g. mineral components and optionally other admixtures and a radical former, which are characterized in that the free radical former initiates a reaction, whereupon the surface of the addition-component is cross-linked with the thermoplastic polymer chains in a chemical manner.

The components of the materials consist of:

A: addition-components A1 and/or A2

A1: mineral components that can have surface hydroxyl groups and/or

A2: components that are immiscible or rarely miscible with the matrix phase and which are of organic base B: a coupling agent chemically bonded on the surface of the mineral component C: a radical former or mixtures of different radical formers, known as photo initiators, crosslinking boosters, photosensitizers D: thermoplastic polymers, oligomers or prepolymers or monomeric (each single or mixtures (blends) thereof) grafted or ungrafted, which are crosslinked with the surface of the addition-component E: a thermoplastic matrix polymer which may be identical with D, or even different Examples of each are:

A: natural or synthetic materials, with variable external habitus (for example, fibers, flakes, particles, mixtures thereof), crystalline or amorphous structure, or mixtures thereof. The chemical nature of the mineral phase may be an oxide or silicate nature, just as hydroxides and oxi-hydrates, and mixed oxides are relevant, as well as pure metals and metal alloys. Examples are: alumina, titanium dioxide, as well as their oxi-hydrates and hydroxides. Examples of silicate components are: quartz, cristobalite, talc, kaolin, metakaolin, calcined kaolin, mica (muscovite, phlogopite, vermiculite), diatomite and diatomaceous earth (siliceous earth), neuburger siliceous earth, glass beads, hollow glass beads, glass flakes, fused silica/quartz, feldspars, plasorites, silicates, wollastonite, basalt, nepheline, nepheline syenite, perlite (expanded and unexpanded), clays, calcium silicate (CS-phaseminerals) and calcium silicate hydrates (CSH-minerals) e.g. tobermorite, xonotlite, glass fibers (E, A, C, D, R, AR), calciumcarbonate, alumosilicates, organic fibers (endloss or chopped) of natural or synthetic origin, or polymer powders, suspensions as an exemplary list.

B: metal alkoxides: silanes, titanates aluminates zirkonates, (functional)-siloxanes, silicone oils, MSA-grafted polymers, metal soaps, olefins. The metal alkoxides, in particular the silanes are used as bifunctional silanes described in the following form:

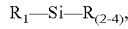

where R1 is a hydrolyzable alkoxy group (for example methoxy- or ethoxy,) or simply hydroxy or chloro or hydrogen. R (2-4) are identical or different and represent organofunctional groups:

R2-R4 can be combinations of the following organofunctional groups:

Amino-, e.g. Dynasilan® AMEO: 3-amino-propy-trietoxy-silane, e.G. Dynasilan® DAMO, N-(2-aminoethyl)-3-aminopropy-trimethoxy-silane, epoxy-(gycidyl-), alkyl-, octylk-, e.g. Dynasilan® OCTMO: tri-methoxy-octyl-silane, methyl-, alkenyl-, alkoxy-, carboxy-, acid-anhydride-, aryl-, phenyl-, vinyl-, e.g. Dynasilan® VTMO: vinyl-tri-methoxy-silane, acyl-, methacryl-, e.g. Dynasilan® MEMO: 3-methacryl-propyl-trimethoxy-silane, nitrile-, acrylnitile-, amido-, photoinitiator-, ureido-, isocyanato-, iso-cyanurate-, sulfonido-, mercapto-, thio-, sulfo-, sulfino-, alkylamino-, dialkyl-, amino-, imino-, nitroso-, oxo-, formyl-, chloro-, bromo-, fluoro-, iodo-, keto-groups.

Likewise, partially condensed silanes which are derived from the above structure may also be used.

C: radical formers are photo initiators, crosslinking agents or radical formers and photosensitizers. The photoinitiators are derived from the groups of the benzophenones and its derivatives, the dialkyl benzile-ketals and the a-diketones, the acylphosphine-oxides of the thionathones, amino-coinitiator systems and amino acrylates. These include: the alkylbenzophenones: 2-methyl-benzophenone, 4-methyl-benzophenone, 2,4-dimethyle 1-benzophenone, 3,4-dimethyl-benzophenone, 4-isopropyl-benzophenon, 4-dodecyl-benzophenone, 2,4,6-trimethyl-benzophenone, 3,3-dimethyl-4-methoxy-benzophenone, 4-phenyl-benzophenone the di-alkoxy-acetophenonels Benziketale: 4'-bisdimethylamino-benzophenone ("Michlersketon"), 2,2' dimethoxy-2-phenyl-aceto-phenone ("benzildimethylketal"), 1-(4-isopropylphenyl)-2-hydroxy-2-methylpropanon-I-one, 2-hydroxy-2-methyl-I-phenylpropane-1-on ("Doracur 1173®"), (1-hydroxy-cyclo-hexyl)-phenyl-ketone, the halogenbenzophenones: chloroderivatives, 2-chloro-benzophenones, 4-chloro-benzophenones, 2,2'-dichloro-benzophenones, the alkoxy-alkyl-thioderivates: 2-,3-,4-methoxy-benzophenones, 2-,4-methylthio-benzophenones, 2-ethoxy-benzophenones, 4-propoxy-benzophenone, 4-butoxy-benzophenones, 4-isopropoxy-benzophenones, the carboxylic ester derivatives: 2-methoxycarbonyl-benzophenones, 3-methoxycarbonyl-benzophenones, 2- or 4-ethoxycarbonyl-benzophenones, 2- or 4-isopropoxycarbonyl-benzophenones, 4-tert.-butoxycarbonyl-benzophenones, 2-butoxycarbonyl-benzophenones, 2,2'-diethoxycarbonyl-benzophenones, the dialkyl-benzileketales/a-diketones: α-aminoalkylphenone, benzoinether, benzoin-butylether, benzoin-isopropylic-ether, 10-phenanthreno-chinon, 1-benzoyl-cyclohexanonol (Irgacure184®), 2-(dimethylamino)-ethyl-acrylate, silylbenzylether, dodecylbenzophenon, benzil, the acyl-phosphine-oxides: Benzoylphosphinaciddiethylester, 2,4,6 trimethylbenzoylphosphineoxide ("TMDPO"), 2,4,6 trim-ethyl-benzoylethoxy-phenylphosphinoxid ("TMPDO"), bis-(2,6-dimethoxybenzoyl)-2,4,4-trimethyl-pentylphosphi-noxid, the thioanthones: 2-/4-chlorothioxanthon, 2-/4-Isopropylic-thioxanthon, 4-dimethylthioxanthone, the Aminocoinitiatorsystems: N-methyldiethanolamine, triethanolamine, the amino-acrylates: 2-(dimethylamino-)ethyl-acrylate, or the radical formers: azo-bis(isobutyronitrile) "AIBN" azobis-(4-cyanovalericacid), dibenzoyl-peroxide, dilauroyl-peroxide, tert-butyl-peroctate, tert.-butyl-perbenzoate, di-(tert-butyl) peroxide, benzopinacol, 2,2'-di(C1-C8-alkyl)benzpinacols, benzoinether, dialkylbenzilketal, dialkoxyacetophenone, acylphosphine, 9,1 O-phenanthrenequinone, diacetyl, furil, anisil, 4,4' dichlorobenzyl, 4,4'-dialkoxybenzil, campherquinone, the photosensitizers: perylene, thioxanthone-derivatives, anthracene-derivatives, the crosslinking agent selected from the group of acrylates: trimethylo-porpan trimethacrylate ("TRIM"), pentaerythriol-triacrylate, pentaerythriol-trimethacrylate, pentaerithriol-pentaacrylate, DipentaerythrolPentamethacrylat, Ditri-methylol-propane-tertaacrylat, Ditri-methylol-propan-tetramethacrylat, the group of cyanates/cyanurates: triallyl-cyanurate ("TAC"), the group of isocyanates/isocyanurates: Triallyisocyanurat ("TRAIC") trimethallyl ("TMAIC"), others: polymethylene-polyphenylen-N-maleinimide, tris-(4-vinyloxybutyl)-trimellitate, bis(4-vinyloxybutyl)-isophthalate.

D: the thermoplastics as polymers, oligomers, pre-polymers and monomers

Polyolefins

| | |
|---|---|
| CSM | chlorosulfonated polyethylene |
| EEA | ethylene-ethyl acrylate copoplymer |
| EPOM | ethylene-propylene terpolymer |
| EPM | ethylene-propylene elastomer |
| EVA | ethylene-vinyl acetate |
| PE | polyethylene (PE-LO, HO-PE, PE-LLO) |
| PE-C | chlorinated polyethylene |
| PEO | polyethylene oxide |
| PE | polyethylene |
| PP | polypropylene |

PA Polyamide 6, PA 6.6 PA 11, PA 12, etc. Polyamides, cast nylon
PVAL Polyvinyl alcohol Halogenated Polymers

| | |
|---|---|
| CSM | Chlorosulfonated polyethylene |
| ETFE | Ethylene tetrafluoroethylene |
| PEP | Polyfluoroethylenepropylene |
| FPM | Fluorine elastomer |
| PE-C | Chlorinated Polyethylene |
| PVC | Polyvinylchloride |
| PVOF | Polyvinylidene fluoride |
| PVF | Polyvinyl fluoride |

Thermoplastic Elastomers:

| | |
|---|---|
| FPM | Fluorine elastomer (thermoplastic) |
| TPE-E | Polyether-ester-copolymers |
| TPE-O | TPE polyolefin-based |
| TPE-S | TPE styrene-based |
| TPE-U | TPE Polyurethane |
| TPE-V | TPE Polyolefin with vulcanized blocks |

E: are components such as D as thermoplastic polymer matrix.

In a special embodiment, the addition-components are combined polymers used for standard cross linking by radiation, also polymers fed with cross linker. In this case the radiation takes place after shaping process.

The present invention also refers to a method for the production of polymeric materials based on thermoplastics and optionally other polymers, addition-components and optionally other admixtures and a radical former, characterized in that the radical former initiates a chemical reaction, after which the surface of the addition-component with the thermoplastic polymer phase is chemically cross linked.

The energetic impact is effected by ionizing radiation, which acts on the particles in the form of electron beams, ultraviolet rays or X-rays.

The present invention also provides the use of polymeric materials based on thermoplastic and optionally other polymers, mineral components and optionally other admixtures and a radical former, wherein the free radical former covering the surface of the addition-component initiates a reaction where the polymer chains are bonded to the surface of the addition-component, as a thermoplastic semi-finished product in conventional thermoplastic shaping processes (so-called primary shaping, joining and machining).

Examples are the extrusion or injection molding process, or the blow forming, as intake manifolds for vehicles, fuel tanks, vehicles, support plates in electrical and electronic applications, bearings, slippery conveying, flatware, pipes, profiles, tubes, plates, cable sheathing, shoe soles, fibers, bristles, housings, gears, screws, seals, fans, rods, fittings and fixtures in a vehicle, especially under the hood, coil formers, blow molded parts, polymer concretes, boards or semi-finished goods for the further processing.

The polymeric materials according to the invention are characterized by increased chemical and mechanical properties as compared to materials where the mineral component is not linked to the polymer.

With the materials according to the invention one can, for example, increase the tensile strength by at least 10%, increase the Young's Modulus by at least 10%, increase the dimensional stability under heat by more than 15 K and increased the notched and unnotched impact strength by at least 15% each in comparison to comparable and/or known materials.

The invention claimed is:

1. A method for producing intermediate products for polymeric materials or parts thereof with addition-components, comprising the steps of: distributing a free radical initiator on the addition-component, covering with a thermoplastic polymer and initiating crosslinking by energetic impact, whereby the polymer-chains are cross-linked to the surface of the addition-component, wherein the thermoplastic polymer is applied on the addition-component, having the distributed free radical initiator thereon, by extrusion compounding.

2. The method for producing intermediate products for polymeric materials or parts thereof with addition-components according to claim 1, wherein the free radical initiator is distributed in solution or as finest a fine dispersed suspension or dispersion or as finest a fine dispersed solid on the addition-component.

3. The method for producing intermediate products for polymeric materials or parts thereof with addition-components according to claim 1, wherein the addition-component is present in a finely divided state with a linear dimension of less than 4 mm in at least one dimension and/or in fibrous type.

4. The method according to claim 1, wherein a coupling agent is provided which acts as a linking or grafting spot between the surface of the addition-component and the polymer.

5. The method for producing intermediate products for polymeric materials or parts thereof with addition-components according to claim 1, wherein the addition-component is covered with a coupling agent and afterwards the free radical initiator is distributed.

6. The method for producing intermediate products for polymeric materials or parts thereof with addition-components according to claim 4, wherein the coupling agent is a silane and/or a bifunctional silane and/or siloxane or a functional poly-siloxane, having the free radical initiator uniformly distributed on the addition-component.

7. The method for producing intermediate products for polymeric materials or parts thereof according to claim 1, wherein the cross linking is initiated with energetic impact that comprises one or more of electron beams, ultraviolet rays, and X-rays.

8. A method for the preparation of polymeric materials or on the basis of thermoplastic polymers, addition-components having a free radical initiator on the surface, wherein a coupling reaction between the addition components and the thermoplastic polymer is initiated by energetic impact through irradiation by high energetic electron beams and/or by UV-rays.

9. The method according to claim 8, wherein the impact of radiation on a particle surface is carried out statistically uniformly by moving relative to each of a radiation source and the particles of a bulk material during exposure to the radiation.

10. The method according to claim 8, wherein the energetic impact by irradiation is performed during compounding by irradiation of the melt directly and/or outgoing strands and/or granulate.

11. The method according to claim 8, wherein the energetic impact is applied to a part itself, after a shaping process and then the cross linking of the surface is performed.

12. A method comprising the steps of: using polymeric materials based on thermoplastic polymers and optionally other polymers, containing an addition-component and a free radical initiator, wherein the free radical initiator starts a reaction whereby thermoplastic polymer chains cover the surface of the addition-component and the polymer chains are bounded chemically covalently at the surface of the addition-component as thermoplastic semi-finished product in thermoplastic shaping processes, and forming a product such as: inlet manifold in an automobile, fuel tanks, mounting plates in electrical and electronic applications, friction bearings, slider conveyor, flatware, tubes, profiles, flexible pipes, boards, cable coatings, shoe soles, fibers, bristles, casings, gear-wheels, screws, seals, ventilators, rods, fixings and mountings in automobiles, parts provided under a hood of the automobile, coil bodies, blow-molded parts, or polymer concretes.

13. An intermediate product for polymeric materials and parts with addition-components, comprising: polymer chains bonded to a surface of the addition-component, wherein these intermediate products are combined with polymers used for cross-linking by radiation, where the irradiation is performed after the shaping process.

14. The method for producing intermediate products for polymeric materials or parts thereof with addition-components according to claim 4, wherein a coupling agent and the free radical initiator are used in a molar ratio of 100:1 to 1:100.

* * * * *